Jan. 1, 1952     O. P. HAWTHORNE     2,580,913
TACKLE HOLDER FOR FISHERMEN
Filed June 15, 1949
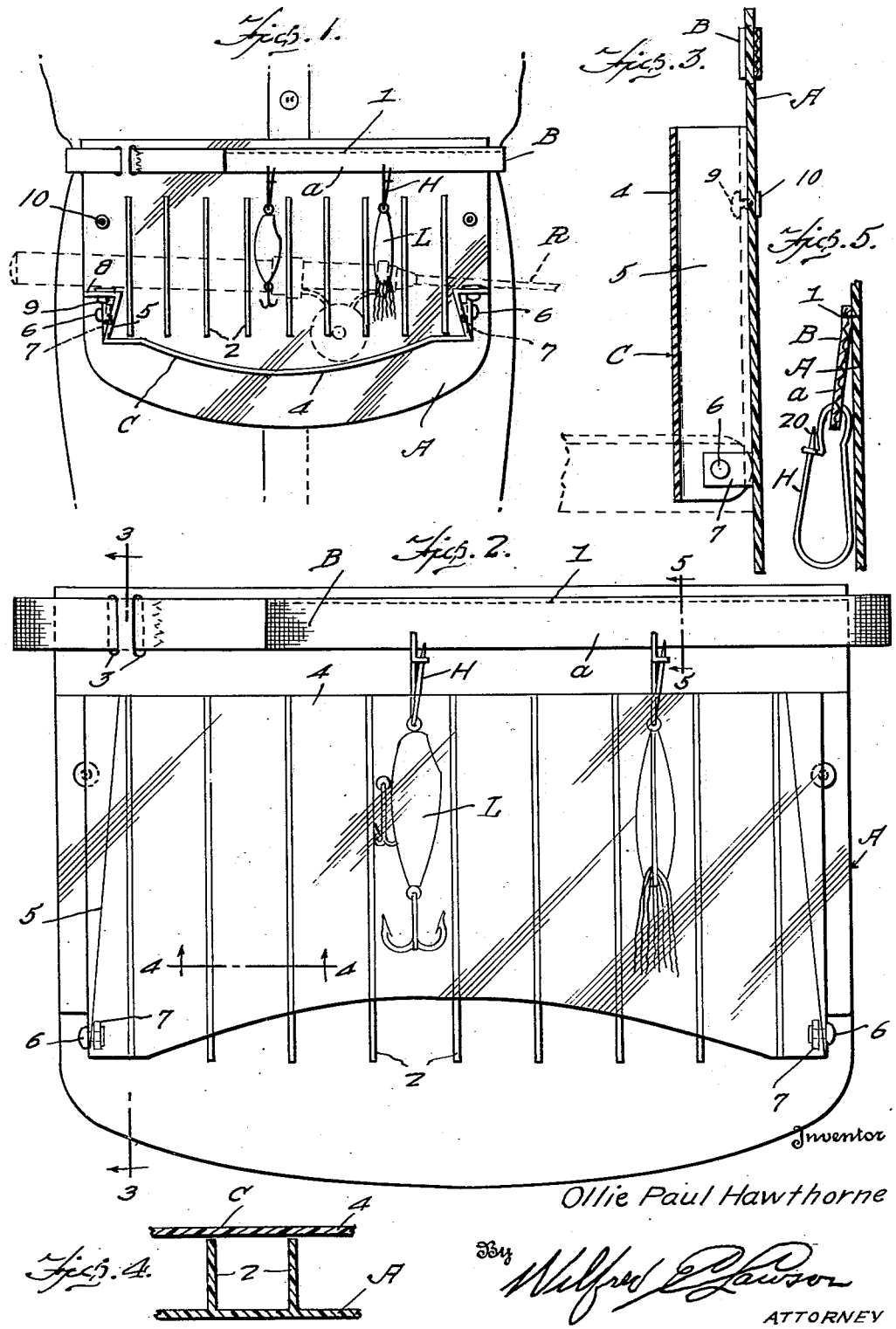
Inventor
Ollie Paul Hawthorne
By
ATTORNEY Patented Jan. 1, 1952

2,580,913

UNITED STATES PATENT OFFICE 2,580,913

TACKLE HOLDER FOR FISHERMEN

Ollie Paul Hawthorne, Pampa, Tex.

Application June 15, 1949, Serial No. 99,317

4 Claims. (Cl. 224—5)

This invention relates to a tackle holder for a fisherman and it is an object of the invention to provide a device of this kind adapted to be worn in the fashion of an apron and wherein the construction of the device is such as to allow ready access to the tackle carried thereby and which also may be used to support a fishing pole, so that the person will have both hands free to allow handling of a lure or the like to be attached to the fishing line.

It is also an object of the invention to provide an article of this kind wherein the tackle, such as lures, carried thereby, may be housed in a manner to prevent the same becoming injured or entangled.

Furthermore it is an object of the invention to provide an apron-like body having associated therewith a waist encircling element for maintaining the body in place upon the user and wherein a portion of said encircling element extends across the apron-like body to provide a means for holding the lures or the like in suspension therefrom.

An additional object of the invention is to provide an article of this kind including an apron-like body having means for removably holding the tackle, such as lures, together with a cover body pivotally attached to the apron member, said cover body when at the limit of its movement toward the apron member overlying the tackle carried by the apron body to provide protection, and when at the limit of its movement in the opposite direction serving as a support for a fishing rod so that the hands of the user will be free to handle the tackle for application to or removal from the fishing line or for other purposes.

The invention consists in the details of construction and in the combination and arrangement of the several parts of the improved holder whereby certain important advantages are attained, as will be hereinafter more fully set forth.

In order that the invention may be better understood, the same will now be described in connection with the accompanying drawing, wherein:

Figure 1 is a view in front elevation of a tackle holder constructed in accordance with an embodiment of the invention and in applied position, the cover member being in its fully opened position and serving as a support for a fishing rod, fragmentarily indicated by broken lines;

Figure 2 is an enlarged elevation view of the tackle holder as herein comprised with the cover member in fully closed position, and the end portions of the waist encircling member broken away;

Figure 3 is a sectional view taken substantially on the line 3—3, of Figure 2, looking in the direction of the arrows;

Figure 4 is a detail sectional view taken substantially on the line 4—4, of Figure 2;

Figure 5 is a detail sectional view taken substantially on the line 5—5 of Figure 2.

In the embodiment of the invention as illustrated in the accompanying drawing, A denotes an apron body of preferred dimensions and material and preferably of a plastic possessing the required inherent flexibility to permit the same to readily conform to the body of the person when applied.

The upper margin of the apron body A is substantially straight from end to end when flattened and overlying the front face of the body A and extending entirely therealong, is the intermediate portion of a waist encircling member or belt B. This member B is preferably of textile material and extends along the upper straight marginal portion of the apron body A. The member B is secured to the apron body A by the row 1, of stitching or otherwise as may be preferred. This row of stitching 1, is along the upper margin of the member B so that the lower portion of the member disposed along and over the body A constitutes a depending flap $a$ to the lower or free marginal portion of which are engaged the hook members H. These hook members H are spaced apart lengthwise of the flap $a$.

Each of the hook members H as herein comprised is formed of a single length of wire of requisite gauge and is in the general form of an elongated loop with the free extremities of the wire comprised in a side member of the loop. One extremity of the wire is pointed, as at 20, to readily pierce the portion $a$ of the member B when applying the hook member in desired location. The second extremity or free end portion of the wire is formed to provide a catch to receive the pointed extremity and thus hold the applied hook against accidental displacement but allowing the hook member H to be applied or removed when desired.

Each of the hook members H is adapted to have suspended therefrom a lure L and the type of the hook member H is such as to permit ready and convenient engagement of a lure L therewith or removal therefrom.

Extending outwardly from the front face of the apron body A, and preferably cast therewith are the outstanding flanges 2, each of which is of a length to extend from the top edge of the body A to a point closely adjacent to, but spaced from the lower margin of the body A. The flanges are spaced apart lengthwise of the apron body A and adjacent flanges 2 are separated sufficiently to easily receive therebetween a lure L or the like suspended from the member B at a point substantially midway of such flanges 2. These flanges 2 also extend outward from the body A a distance greater than the thickness of the lure L or the like, positioned therebetween so that said lure L or the like will be effectively housed when the cover member C is in closed position.

The member or belt B is of a length to readily surround the waist of the average person and after the member or belt B has been disposed around the waist, the outer free portion thereof is threaded through the spaced slots 3 in one upper corner portion of the body A. The opposite end portion of the member or belt B terminates inwardly of the slots 3.

The cover member C is also preferably of plastic and includes a body panel 4 of a size to substantially overlie when in closed position the field of the body A carrying the flanges 2 and the major portion of the panel 4 is longitudinally outbowed as shown in Figure 1. The top and end edges of the panel 4 are straight, with the side edges perpendicular to the top or outer edge and the side edges are defined by the inwardly directed flanges 5, each of which is outwardly, or to the outer side, of an end flange 2.

The inner, or lower, portion of each cover flange 5 is pivotally connected, as at 6, with the outstanding posts or lugs 7 preferably cast with the apron body A. The free longitudinal margins of the cover flanges 5 are defined by the lateral flanges 8 which have close contact with the outer face of the body A when the cover member C is in fully closed position and the outer or upper portions of the lateral flanges 8 and the upper side portions of the apron body A are provided with the coacting separable fastening element halves 9 and 10, such as a conventional resilient head and socket.

When the cover member C is in its lowermost position it extends outwardly from the body A at substantially right angles thereto and below the flanges 2 with the bottom or hinged edge in contact with the body A. In such opened position, the cover member C serves as a shelf to support a fishing rod R, or the like, and thus leaves both hands of the fisherman free to handle the lures L, to apply or remove the same from a fishing line and also to remove a lure L from or apply one to the apron body A as hereinbefore described.

From the foregoing description it is thought to be obvious that a holder for a fisherman constructed in accordance with the present invention is particularly well adapted for use by reason of the convenience and facility with which it may be assembled and used.

I claim:

1. A fisherman's lure holder of the class described, comprising an apron body, a waist encircling band having a portion disposed over one side of said body along the upper marginal portion thereof, means securing said band along the top longitudinal edge thereof to the body providing a depending flap, a plurality of hanger elements attached to and depending from the flap, a plurality of spaced elements disposed upon said one side of the body and projecting forwardly therefrom, each of said hanger elements being positioned to hang in a line passing between two of said spaced elements, and a cover member hingedly secured to the body adjacent to the lower margin thereof, said cover member when in closed position being disposed over the spaced elements in relatively close relation thereto to form therewith a lure enclosing compartment.

2. A fisherman's lure holder of the character described in claim 1, wherein the said hanger elements each comprises a hook member having a pin part, the hook member being attached to the flap of the waist encircling band by having the pin part passed through said flap.

3. A fisherman's tackle carrier comprising an apron-like body of relatively stiff material, a waist belt connected with the body across the top edge thereof, a plurality of long flange elements disposed in spaced parallel relation on a face of the body in perpendicular relation to said top edge and projecting forwardly from said face, a plurality of hanger elements attached to the body adjacent to said top edge in position to suspend lures in the spaces between said flanges, a cover having a front portion of a size to overlie said flanges, said cover comprising a flange along each side edge of said front portion, a hinge connection between each side flange of the cover at the lower end thereof and said body by which the cover may be swung from a vertical position in front of the body to a horizontal position in which it projects forwardly from the body, means for maintaining the cover in said vertical position, and means for maintaining the cover in said horizontal position.

4. A fisherman's tackle carrier of the character stated in claim 3, wherein said cover further includes a lateral flange carried by each of said cover flanges and positioning against the front of said body when the cover is in the said vertical position, and the first named means comprises fastening elements between the body and said lateral flanges.

OLLIE PAUL HAWTHORNE.

REFERENCES CITED

The following references are of record in the file of this patent:

UNITED STATES PATENTS

| Number | Name | Date |
|---|---|---|
| 415,837 | Frisbee | Nov. 26, 1889 |
| 1,484,399 | Kroha | Feb. 19, 1924 |
| 1,486,470 | Welch | Mar. 11, 1924 |
| 1,574,416 | Campbell | Feb. 23, 1926 |
| 1,711,677 | Hansen | May 7, 1929 |
| 2,062,386 | Withey | Dec. 1, 1936 |
| 2,315,095 | Rhodes | Mar. 30, 1943 |
| 2,316,833 | Baron | Apr. 20, 1943 |